United States Patent Office 3,198,063
Patented Aug. 3, 1965

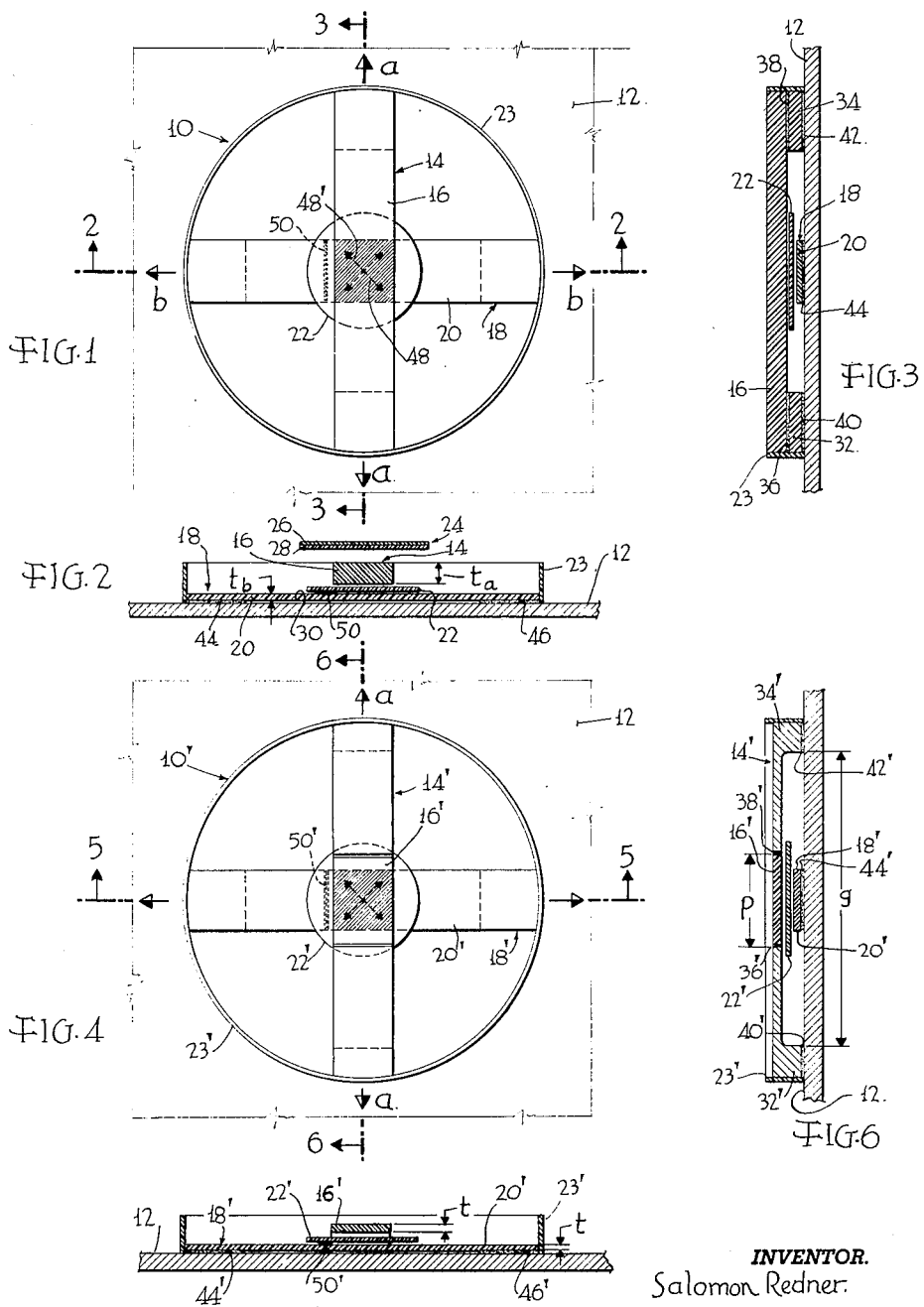

3,198,063
DIRECT READING UNIAXIAL PHOTOELASTIC TRANSDUCER
Salomon Redner, Norristown, Pa., assignor to The Budd Company, Philadelphia, Pa., a corporation of Pennsylvania
Filed Feb. 1, 1961, Ser. No. 86,405
8 Claims. (Cl. 88—14)

This invention pertains to photoelastic transducers for the resolution and quantitative indication of uniaxial workpiece surface stresses and more particularly to such transducers adapted for normal incidence observation.

Conventionally, workpiece stresses are indirectly determined from the collection and simultaneous analysis of at least two sets of workpiece strain data. Recently, however, certain photoelectric stress-gauging methods and devices have been developed which yield uniaxial stress resolution directly upon observation of forced-birefringence, as disclosed and claimed in U.S. Patent 3,077,813. While the latter may be advantageously employed for the solution of many practical problems, an inherent disadvantage thereof is the necessity of performing observations by means of parallel-incidence light, that is by means of light directed parallel with the workpiece surface, rather than by the more convenient normal incidence light. Further, while the prior photoelastic stress gauges give point-by-point information which is an advantage in many cases, they do not yield directly the average stress information particularly required by certain engineering problems.

It is therefore an object of this invention to provide a photoelastic transducer whereby the average magnitude of a workpiece stress along a given direction may be determined directly upon but a single normal-incidence observation of forced-birefringence.

According to an illustrated embodiment, the photoelastic stress transducers of this invention comprise a first photoelastic extensometer serially including in its gauge length a first strip of forced-birefringent material, and a second photoelastic extensometer serially including in its gauge length a second strip of forced-birefringent material, the first and second extensometers being mutually perpendicularly oriented with the first strip overlaying the second strip and the ratio of the strain sensitivity of the second extensometer for generation of normal-incidence birefringence by the second strip to the strain sensitivity of the first extensometer for the generation of normal-incidence birefringence by the first strip being equal substantially to Poisson's ratio for given workpiece material, and a birefringence inverter interposed between the first and second strips whereby normal-incidence transducer forced-birefringence is directly related to the magnitude of a workpiece surface stress along the gauge length of the first extensometer when the transducer is attached at the ends of the extensometers to the surface of a workpiece of the given material.

While the invention is specifically defined in the claims appended to this application, a better understanding will be had upon consideration of the following description taken in conjunction with the accompanying drawing wherein:

FIGS. 1 to 3 illustrate plan and cross-sectional views of a preferred photoelastic stress transducer embodiment, and FIGS. 4 to 6 illustrate plan and cross-sectional views of an alternative transducer embodiment, constructed according to this invention.

With particular reference to FIGS. 1 to 3, a first embodiment 10 of photoelastic workpiece-stress transducers of this invention is shown in operative relationship with a generalized workpiece, indicated by surface 12, as applied for resolution and measurement of a variable workpiece surface stress parallel with direction $aa$. Major components of transducer 10 comprise: a first photoelastic extensometer 14 oriented parallel with direction $aa$ and serially including a first photoelastic indicator 16; a second photoelastic extensometer 18 oriented parallel with a direction $bb$, at right angles to direction $aa$, and serially including a second photoelastic indicator 20; and an optical rotator, or birefringence inverter 22, interposed between indicators 16 and 20 at their intersection. Optionally, a means such as ring 23 may be utilized for maintaining relative orientation of the transducer components before their operational assembly upon a workpiece.

The elements of the alternative embodiment depicted in FIGS. 4 to 6 which are equivalent to those of transducer 10 are designated by like numerals, primed, and the general discussion is equally applicable to both embodiments.

Required auxiliary apparatus consists of a light source (ordinary room illumination, for example), a polariscope, and a reflector. The polariscope 24 (FIG. 2) may be a laminate of a sheet-material linear polarizer 26 and a quarter-wave retardation plate 28, overlaying the intersecting portions of photoelastic indicators. The workpiece surface may serve as the reflector or the lower surface of the second indicator may be made reflecting by means of a suitable coating 30. Substantially normally incident light is polarized by polariscope 24, transmitted through elements 16, 22 and 20 to reflector 30, retransmitted through elements 20, 22 and 16, and analyzed by polariscope 24. The apparent colors (wavelengths of emitted light) at the extensometer intersection (shaded in the drawing) are the visible indicia of net forced-birefringence produced by the transducer.

At the workpiece surface 12, the unit surface strain $e_a$ along direction $aa$, the unit surface strain $e_b$ along direction $bb$ perpendicular to $aa$, and the parallel stresses $s_a$ and $s_b$, are related according to:

$$e_a = (s_a/E_w) - (\mu_w s_b/E_w) \qquad \text{I}$$
$$e_b = (s_b/E_w) - (\mu_w s_a/E_w) \qquad \text{II}$$

where $E_w$ and $\mu_w$ are the elastic modulus and Poisson's ratio for the workpiece material.

Simultaneous solution of the Equations I and II yields the following expression for resolving the magnitude of workpiece surface stress $s_a$:

$$s_a = (E_w/1-\mu_w^2)(e_a+\mu_w e_b) = k_w(e_a+\mu_w e_b) \qquad \text{III}$$

where $k_w$ is a constant for a given workpiece material. The forced-birefringence produced by the transducers of this invention is directly related to the factor $(e_a+\mu_w e_b)$ and, therefore, directly related to the stress $s_a$ at the surface of the workpiece.

Photoelastic extensometers in general comprise two relatively rigid end attachment means spaced apart to define a gauge length $g$ and an indicator strip of forced-birefringent material extending serially between the end attachment means. In conventional extensometers the effective length of the indicator strip $p$ is equal to the extensometer gauge length $g$ and the maximum indicator unit strain is equal to the extensometer unit strain. However, improved strain multiplication photoelastic extensometers are disclosed and claimed in U.S. Patent 3,074,271. In the latter, the effective length of the indicator strip is a minor fraction of the gauge length, the remainder of the gauge length being relatively rigid, and substantially the entire extensometer strain appears over the length of the indicator. The second principal strain setup is an extensometer indicator of either type is due almost solely to the Poisson effect.

The magnitude of birefringence B produced by a photoelastic indicator in light directed normally of its principal strains is given according to:

$$B = k_p d(n - n') \quad \text{IV}$$

where $k_p$ is the photoelastic constant for the indicator material, $d$ is the total light path length through the indicator material, $n$ is the maximum indicator unit strain, and $n'$ is the minimum indicator unit strain.

For a photoelastic extensometer attached to a workpiece surface, the maximum indicator unit strain $n$ equals the product of parallel workpiece unit strain $e$ and strain multiplication factor $g/p$ $(n = eg/p)$; the minimum unit strain $n'$ is related to the maximum unit strain $n$ by Poisson's ratio $\mu_p$ for the indicator material, $(n' = \mu_p n)$; and when observations are made by normally incident and reflected light, total light path length $d$ is twice the thickness $t$ of the indicator, Equation IV may then be rewritten as:

$$B = k_p(1 + \mu_p)(2t)(g/p)e = k_e e \quad \text{V}$$

The constant $k_e$, the ratio of indicator forced-birefringence to extensometer unit strain, may be termed the extensometer sensitivity. Extensometer sensitivity may be adjusted by selection of indicator material, of indicator thickness, or of the ratio of indicator length to extensometer gauge length. When indicator length and gauge length are equal, the factor $(g/p)$ is unity and Equation V is independent of extensometer gauge length.

Consider a first photoelastic extensometer attached to a workpiece surface parallel with the direction of an unknown surface strain $s_a$ so as to sense the parallel workpiece strain $e_a$, and a second photoelastic extensometer attached to the workpiece surface perpendicular to the first extensometer so as to sense $e_b$, the workpiece surface strain normal to $e_a$. With the extensometer indicators superimposed, there would be a summation along a common normal incidence light path of a forced-birefringence $B_a$ related to $e_a$ and of a forced-birefringence $B_b$ related to $e_b$. However, the respective indicator maximum strains would be mutually perpendicular and the signs of $B_a$ and $B_b$ would differ.

U.S. Patent 3,096,388 discloses optical rotator means which, in effect, change the sign of, or invert, a second birefringence relative to a first, in summations along a common light path. Because of the analogy with electrical signal polarity reversal, these optical rotators are referred to herein as birefringence inverters.

With a birefringence inverter interposed between the crossing indicator strips, summation of forced-birefringence produces a net transducer forced-birefringence $B_T$ according to:

$$B_T = B_a + B_b = k_a e_a + k_b e_b \quad \text{VI}$$

where $k_a$ and $k_b$ are the respective extensometer sensitivities determinable according to Equation V above. When the parameters of the second extensometer, relative to those of the first, are such that:

$$k_b = \mu_w k_a \quad \text{VII}$$

where $\mu_w$ is Poisson's ratio for a given workpiece material, Equation VI becomes:

$$B_T = k_a(e_a + \mu_w e_b) \quad \text{VIII}$$

By combining with Equation III the relationship:

$$s_a = (k_w/k_a)B_T = k_T B_T \quad \text{IX}$$

is established relating the unknown stress magnitude $s_a$ directly with visible forced-birefringence $B_T$ by a transducer constant $k_T$ predeterminable for a given pair of extensometers operatively associated with a given workpiece.

With further specific reference to FIGS. 1 to 3, the first photoelastic extensometer 14 comprises a forced-birefringent material indicator strip 16, of thickness $t_a$, integrally attached to vertical spacer blocks 32 and 34 by cement layers 36 and 38. Spacer blocks 32 and 34 serve as end attachment means and may be rigidly attached to workpiece surface 12 by cement layers 40 and 42 to align the first extensometer gauge length parallel with the direction $aa$ of the workpiece stress $s_a$ which is to be resolved.

The second photoelastic extensometer 18 comprises a second forced-birefringent material indicator strip 20, having a thickness $t_b$, and end attachment means 44 and 46, conveniently layers of cement, for rigid attachment to workpiece surface 12. The second extensometer is aligned perpendicularly of the first extensometer and parallel with direction $bb$.

A birefringence inverter 22 is interposed between the crossing portions of indicators 16 and 20. Inverter 22 is illustrated as a half-wave retardation plate with its optic axes oriented at 45° to directions $aa$ and $bb$ as indicated by the dotted arrows 48 and 48'. The inverter 22 may be held in position by a line of cement 50 attaching it to indicator 20.

Indicator strips 20 and 16 are of the same material but the thickness of the second strip is chosen equal to the product of the first indicator thickness and Poisson's ratio for the given workpiece material, $(t_b = \mu_w t_a)$, in order to satisfy Equation VII for the relationship of the respective extensometer sensitivities $k_a$ and $k_b$ as defined above.

In the embodiment of FIGS. 4 to 6, the first extensometer 14' comprises a first forced-birefringent material indicator strip 16' and the end attachment means include relatively rigid load transfer elements 32' and 34' attached to indicator 16' by cement layers 36' and 38' and to workpiece surface 12 by cement layers 40' and 42'. The gauge length $g$ of extensometer 14' is the unattached length between cement layers 40' and 42', and the indicator length $p$ is the parallel length between load transfer elements 32' and 34'. Since substantially all of the extensometer strain occurs along the indicator strip, the indicator maximum unit strain is increased over the extensometer unit strain by a strain multiplication factor $(g/p)$.

Inverter 22' and extensometer 18' of transducer 10' may be duplicates of the corresponding elements of transducer 10 as described above. Here, however, indicators 16' and 20' are equal thicknesses of the same forced-birefringent material. The relationship between extensometer sensitivities required by equation VII is achieved by having the strain multiplication factor equal to the reciprocal of Poisson's ratio for a specific workpiece material, that is by selecting $(g/p)$ according to: $p = \mu_w g$.

There are of course various other relationships among the parameters of the photoelastic extensometers which will achieve the condition stated by Equation VII. The latter condition, the mutual perpendicularity of the extensometers, and the series orientation of the birefringence inverter and forced-birefringent indicators constitute the necessary prescription of a photoelastic transducer which provides for direct resolution of workpiece stress magnitudes.

Poisson's ratio for most common metals is with 10% of 0.3 and this figure may be assumed in most transducer applications without introduction of significant error. This is especially true where the workpiece strain along the direction of the resolved stress is greater than the perpendicular strain, a condition which exists during the more critical measurements of maximum stresses. Therefore, 0.3 may be considered the substantial equivalent of $\mu_w$ in the prescription of stock transducers according to this invention.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A photoelastic stress transducer for given workpieces comprising two photoelastic extensometers each including a forced-birefringent material indicator, means mutually perpendicularly orienting said extensometers with one said indicator overlaying the other said indicator, a birefringence inverter, means interposing said inverter between said indicators, the ratio of the strain sensitivities of said extensometers being equal substantially to Poisson's ratio for the given workpieces when said extensometers are attached at their ends to a surface of said workpieces.

2. A photoelastic stress transducer comprising, in combination with workpiece attachment means therefor, two, flat, uniform thickness, perpendicularly crossing, strips of a forced-birefringent material and a birefringence inverter interposed between said strips, the ratio of the thicknesses of said strips being substantially equal to 0.3.

3. A photoelastic stress transducer exhibiting net forced-birefringence directly related to a unidirectional stress at the surface of a workpiece, said transducer comprising first and second uniform thickness elongated strips of a forced-birefringent material, said first strip being attached at its ends to the workpiece surface, said second strip overlaying said first strip and being attached at its ends to the workpiece perpendicularly of said first strip, and a half-wave retardation plate having its axes oriented at 45° to the lengths of said strips interposed between said strips, the ratio of the thicknesses of said strips being equal substantially to Poisson's ratio for the workpiece.

4. A photoelastic transducer comprising a first photoelastic extensometer serially including in its gauge length a first strip of forced-birefringent material, a second photoelastic extensometer serially including in its gauge length a second strip of forced-birefringent material, the first and second extensometers being mutually perpendicularly oriented with the first strip overlaying the second strip and the ratio of the strain sensitivity of the second extensometer for generation of normal-incidence birefringence by the second strip to the strain sensitivity of the first extensometer for the generation of the normal-incidence birefringence by the first strip being equal substantially to Poisson's ratio for a given workpiece material, and a birefringence inverter interposed between the first and second strips, whereby normal-incidence transducer forced-birefringence is directly related to the magnitude of workpiece surface stresses along the gauge length of the first extensometer when the transducer is attached at the ends of the extensometers to the surface of a workpiece of the given material.

5. The transducer of claim 4 wherein the thickness of said second indicator is substantially equal to the product of the thickness of said first indicator and Poisson's ratio for the material of the workpiece.

6. The extensometer of claim 4 wherein the length of said first indicator is substantially equal to the product of the gauge length of said first extensometer and Poisson's ratio for the material of the workpiece.

7. A photoelastic stress transducer yielding net normal-incidence forced-birefringence directly related to stresses along a given direction at the surface of a workpiece of a given material, said transducer comprising a first photoelastic extensometer attached to the workpiece surface parallel with the given direction serially including in its gauge length a first strip of forced-birefringent material, a second photoelastic extensometer attached to the workpiece surface perpendicularly of the given direction serially including in its gauge length a second strip of forced-birefringent material, a birefringence inverter overlaying said second strip, said first strip overlaying said inverter, and the ratio of the strain sensitivity of said second extensometer to the strain sensitivity of said first extensometer being substantially equal to Poisson's ratio for the material of the workpiece.

8. A photoelastic transducer comprising first and second photoelastic extensometers each including extensometer gauge length defining attachment means and serially therebetween a forced-birefringence material indicator, a birefringent inverter comprising a half-wave retardation plate attached to one of said extensometers and having its optic axis oriented at 45° with the extensometer gauge lengths, the gauge length defining attachment means of one of said extensometers including relatively rigid load transfer portions extended along the gauge length of that extensometer and being serially attached to a forced-birefringent material indicator strip having a length related to the extensometer gauge length by Poisson's ratio for the workpiece material, said first and second extensometers being mutually perpendicularly oriented with one of said indicators overlaying the other of said indicators and with said birefringence inverter interposed therebetween.

References Cited by the Examiner

UNITED STATES PATENTS 2,592,223  4/52  Williams _____ 73—88.5
3,034,395  5/62  Zandman _____ 88—14

OTHER REFERENCES

Strong: Concepts of Classical Optics, a textbook published by Freeman and Co., Dec. 2, 1958. (Copy received in Pat. Off. Lib., page 388 only.)

JEWELL H. PEDERSEN, Primary Examiner.

EMIL G. ANDERSON, Examiner.